ated Nov. 17, 1970

United States Patent Office 3,541,096
Patented Nov. 17, 1970

3,541,096
2-ARYL-SUBSTITUTED-TETRAHYDRO-HALO-SULFAMYL-QUINAZOLINONES
Bola Vithal Shetty, Rochester, N.Y., assignor to Pennwalt Corporation, East Orange, N.J., a corporation of Pennsylvania
No Drawing. Continuation-in-part of application Ser. No. 683,450, Nov. 16, 1967. This application Dec. 24, 1968, Ser. No. 786,773
Int. Cl. C07d 51/48
U.S. Cl. 260—256.5
13 Claims

ABSTRACT OF THE DISCLOSURE

A 2-aryl-3-aryl or aralkyl-6-sulfamyl-7-halo(including 7-trifluoromethyl)-1,2,3,4-tetrahydro-quinazolinone having diuretic characteristics is made by reduction of the corresponding unsaturated compound or by cyclizing the anthranilamide. A typical compound is 2-phenyl-3-o-tolyl-6-sulfamyl-7-chloro-1,2,3,4-tetrahydro-4-quinazolinone.

---

This application is a continuation-in-part of my copending application Ser. No. 683,450 filed Nov. 16, 1967, which in turn is a continuation-in-part of my copending application Ser. No. 517,995, filed Jan. 3, 1966. My copending application Ser. No. 683,450 discloses the 1-phenylalkyl-2-phenyl compounds of this present application in paragraph 1 on page 3 of the said application Ser. No. 683,450, a specific compound is disclosed in Table I on page 7, and a general disclosure of the structure of the compounds of the present case is disclosed in the third paragraph of said application, reference to the parent application Ser. No. 517,995 being made in the first and third paragraphs of Ser. No. 683,450. The entire disclosure of the application Ser. No. 517,995, now Patent 3,360,518, and the application Ser. No. 683,450, now Patent 3,452,019, are incorporated in the present application by reference.

The invention relates to 2-aryl quinazolinone compounds effective as diuretics and saluretics.

In accordance with this invention 1,2,3,4-tetrahydro-7-halo(including halo-alkyl)-6-sulfamyl-3-aryl or aralkyl-4-quinazolinone compounds have in the 2-position an aryl group, such as a phenyl or naphthyl, unsubstituted or substituted; the aryl substituent being hydroxy, lower alkoxy, lower alkyl, lower alkoxy lower alkyl, halogen, trifluoromethyl, sulfamyl or amino including lower alkyl amino. These compounds are useful as diuretic and saluretic agents.

The preferred compounds of the invention have the formula:

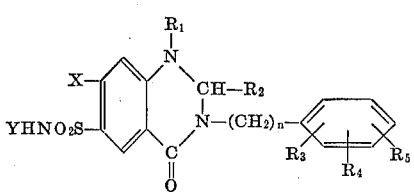

or the pharmaceutically effective salts thereof, in which
X is halogen or trifluoromethyl,
Y is hydrogen or lower alkyl,
$R_1$ is hydrogen or lower alkyl, or phenyl lower alkyl,
$R_2$ is phenyl or phenyl substituted with lower alkyl, halogen, lower alkoxy, lower alkoxy lower alkyl, amino, lower alkyl substituted amino, trifluoromethyl, sulfamyl or hydroxy,
$R_3$ is hydrogen, lower alkyl, hydroxy, lower alkoxy, lower alkoxy lower alkyl, amino, lower alkyl substituted amino, sulfamyl, halogen or trifluoromethyl,
$R_4$ and $R_5$ are any of $R_3$, and
$n$ is an integer from 0–4.

In the above formula X is preferably chlorine or trifluoromethyl, but bromine and the other halogens are not precluded. Y is preferably hydrogen, but lower alkyl such as methyl, ethyl and the like may be used; $n$ is preferably zero. $R_1$ is preferably hydrogen or lower alkyls such as methyl, ethyl, propyl, and isopropyl, but phenyl alkyls such as benzyl or phenyl ethyl may be used. The aryl of $R_2$ is preferably a monocyclic carbocyclic aryl, e.g., phenyl, but bicyclic carbocyclic aryl may be used, e.g., naphthyl. $R_3$, $R_4$, and $R_5$ may be any of the stated radicals in one or more of the ortho, meta or para positions. Preferably $R_3$ is methyl in the ortho position; also where sulfamyl is used it is preferably present in the meta or para position with methyl in the ortho position. The substituted aryl of $R_2$ is suitably substituted with hydroxy, alkoxy (preferably lower alkoxy), lower alkyl, lower alkoxy lower alkyl, halogen, sulfamyl, trifluoromethyl, amino or lower alkyl substituted amino.

The terms "lower alkyl" and "lower alkoxy" denote alkyl and alkoxy groups which advantageously contain not more than 8 carbon atoms and preferably contain 1–4 carbon atoms.

Specific suitable compounds of the above formula include 2-phenyl-3-o-tolyl-6-sulfamyl-7-chloro-1,2,3,4-tetrahydro-4-quinazolinone;
2-phenyl-3-o-tolyl-6-sulfamyl-7-trifluoromethyl-1,2,3,4-tetrahydro-4-quinazolinone;
2-o-chlorophenyl-3-o-tolyl-6-sulfamyl-7-chloro-1,2,3,4-tetrahydro-4-quinazolinone;
2-o-tolyl-3-o-tolyl-6-sulfamyl-7-trifluoromethyl-1,2,3,4-tetrahydro-4-quinazolinone;
2-o-tolyl-3-o-tolyl-6-sulfamyl-7-chloro-1,2,3,4-tetrahydro-4-quinazolinone;
2-phenyl-3-o-tolyl-6-methylaminosulfonyl-7-chloro-1,2,3,4-tetrahydro-4-quinazolinone;
2-phenyl-3-(p-chlorophenyl)-6-sulfamyl-7-chloro-1,2,3,4-tetrahydro-4-quinazolinone;
2-phenyl-3-o-tolyl-6-methylaminosulfonyl-7-chloro-1,2,3,4-tetrahydro-4-quinazolinone;
2-phenyl-3-phenyl-6-sulfamyl-7-chloro-1,2,3,4-tetrahydro-4-quinazolinone;
2-phenyl-3-(2'-methyl-3'-chlorophenyl)-6-sulfamyl-7-chloro-1,2,3,4-tetrahydro-4-quinazolinone;
2-phenyl-3-(p-chlorophenyl)-6-methylaminosulfonyl-7-chloro-1,2,3,4-tetrahydro-4-quinazolinone;
2-phenyl-3-(2'-methylbenzyl)-6-sulfamyl-7-chloro-1,2,3,4-tetrahydro-4-quinazolinone;
2-p-butylphenyl-3-o-tolyl-6-sulfamyl-7-chloro-1,2,3,4-tetrahydro-4-quinazolinone;
2-o-propylphenyl-3-o-tolyl-6-sulfamyl-7-trifluoromethyl-1,2,3,4-tetrahydro-4-quinazolinone;
2-m-ethylphenyl-3-o-tolyl-6-sulfamyl-7-trifluoromethyl-1,2,3,4-tetrahydro-4-quinazolinone;
2-(trifluoromethylphenyl)-3-o-tolyl-6-sulfamyl-7-chloro-1,2,3,4-tetrahydro-4-quinazolinone;
2-o-chloromethylphenyl-3-o-tolyl-6-sulfamyl-6-chloro-1,2,3,4-tetrahydro-4-quinazolinone;
2-dichlorophenyl-3-o-tolyl-6-sulfamyl-7-chloro-1,2,3,4-tetrahydro-4-quinazolinone;
2-o-trichloromethylphenyl-3-o-tolyl-6-sulfamyl-7-chloro-1,2,3,4-tetrahydro-4-quinazolinone;
1-benzyl-2-o-chlorophenyl-3-o-tolyl-6-sulfamyl-7-chloro-1,2,3,4-tetrahydro-4-quinazolinone;
2-(3'-sulfamyl-4'-chlorophenyl)-3-o-tolyl-6-sulfamyl-7-chloro-1,2,3,4-tetrahydro-4-quinazolinone;

2-phenyl-3-(o-hydroxyphenyl)-6-sulfamyl-7-chloro-1,2,3,4-tetrahydro-4-quinazolinone;
2-phenyl-3-(o-methoxyphenyl)-6-sulfamyl-7-chloro-1,2,3,4-tetrahydro-4-quinazolinone;
2-phenyl-3-(p-aminophenyl)-6-sulfamyl-7-chloro-1,2,3,4-tetrahydro-4-quinazolinone;
2-phenyl-3-(2'-methyl-4'-aminophenyl)-6-sulfamyl-7-chloro-1,2,3,4-tetrahydro-4-quinazolinone;
2-phenyl-3-(2'-methyl-3'-sulfamylphenyl)-6-sulfamyl-7-chloro-1,2,3,4-tetrahydro-4-quinazolinone;
2-phenyl-3-(2'-methyl-3'-sulfamylphenyl)-6-sulfamyl-7-trifluoromethyl-1,2,3,4-tetrahydro-4-quinazolinone;
2-naphthyl-3-(2'-methyl-3'-chlorophenyl)-6-sulfamyl-7-trifluoromethyl-1,2,3,4-tetrahydro-4-quinazolinone;
2-phenyl-3-(2'-methyl-3'-chlorophenyl)-6-methylaminosulfonyl-7-chloro-1,2,3,4-tetrahydro-4-quinazolinone;
2-naphthyl-3-(2'-sulfamylphenyl)-6-sulfamyl-7-chloro-1,2,3,4-tetrahydro-4-quinazolinone;
2-phenyl-3-benzyl-6-sulfamyl-7-chloro-1,2,3,4-tetrahydro-4-quinazolinone;
1-methyl-2-phenyl-3-o-tolyl-6-sulfamyl-7-chloro-1,2,3,4-tetrahydro-4-quinazolinone;
1-benzyl-2-phenyl-3-o-tolyl-6-sulfamyl-7-chloro-1,2,3,4-tetrahydro-4-quinazolinone;
2-phenyl-3-(2'-methyl-4'-chlorophenyl)-sulfamyl-7-chloro-1,2,3,4-tetrahydro-4-quinazolinone;
2-phenyl-3-(2'-trifluoromethyl-4'-aminophenyl)-6-sulfamyl-7-chloro-1,2,3,4-tetrahydro-4-quinazolinone;
the sodium salt of 2-phenyl-3-o-tolyl-6-sulfamyl-7-chloro-1,2,3,4-tetrahydro-4-quinazolinone;
the potassium salt of 2-phenyl-3-o-tolyl-6-sulfamyl-7-chloro-1,2,3,4-tetrahydro-4-quinazolinone, and 2-phenyl-3-(o-trifluoromethylphenyl) - 6 - sulfamyl-7-chloro-1,2,3,4-tetrahydro-4-quinazolinone which may be produced by the hydrogenation of 2-phenyl-3-(o-trifluoromethylphenyl) - 6 - sulfamyl - 7 - chloro-4(3H)-quinazolinone.

ADDITIONAL EXAMPLES

| X | Y | $R_1$ | $R_2$ | $R_3$ | $R_4$ | $R_5$ | n |
|---|---|---|---|---|---|---|---|
| Cl | H | H | 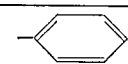 | 2—$CH_3$ | H | H | 0 |
| $CF_3$ | H | H | 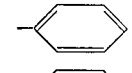 | 2—$CH_3$ | H | H | 0 |
| Cl | $CH_3$ | H | 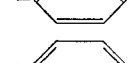 | 2—$CH_3$ | H | H | 0 |
| Cl | H | $CH_3$ | 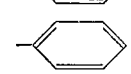 | 2—$CH_3$ | H | H | 0 |
| Cl | H | H | 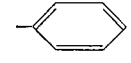 | H | H | H | 0 |
| Cl | H | H | 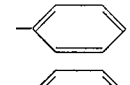 | H | 3—$CH_3$ | H | 0 |
| Cl | H | H | 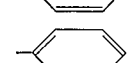 | H | H | 4—$CH_3$ | 0 |
| Cl | H | H | 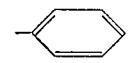 | 2—$CH_3$ | 3—$CH_3$ | 4—$CH_3$ | 0 |
| Cl | H | H | 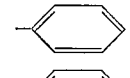 | 2—OH | H | H | 0 |
| Cl | H | H | 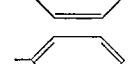 | 2—$OCH_3$ | H | H | 0 |
| Cl | H | H | 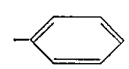 | 2—$NH_2$ | H | H | 0 |
| Cl | H | H | 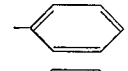 | H | H | 4—$NH_2$ | 0 |
| Cl | H | H | 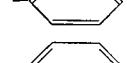 | H | H | 4—$NHCH_3$ | 0 |
| Cl | H | H | 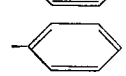 | H | H | 4—$N(CH_3)_2$ | 0 |
| Cl | H | H |  | 2—$SO_2NH_2$ | H | H | 0 |
| Cl | H | H | 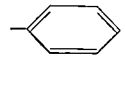 | 2—Cl | H | H | 0 |
| Cl | H | H |  | 2—$CF_3$ | H | H | 0 |
| Cl | H | H |  | 2—$CH_3$ | H | H | 1 |
| Cl | H | H |  | 2—$CH_3$ | H | H | 2 |
| Cl | H | H |  | 2—$CH_3$ | H | H | 3 |

ADDITIONAL EXAMPLES—Continued

| X | Y | $R_1$ | $R_2$ | $R_3$ | $R_4$ | $R_5$ | n |
|---|---|---|---|---|---|---|---|
| Cl | H | H | –C₆H₅ | 2–CH₃ | H | H | 4 |
| Cl | H | H | –C₆H₄–CH₃ (CH₃ at para) | 2–CH₃ | H | H | 0 |
| Cl | H | H | –C₆H₄–Cl | 2–CH₃ | H | H | 0 |
| Cl | H | H | –C₆H₄–OH | 2–CH₃ | H | H | 0 |
|   |   |   | –C₆H₄–OCH₃ | 2–CH₃ | H | H | 0 |
| Cl | H | H | –C₆H₄–NH₂ | 2–CH₃ | H | H | 0 |
| Cl | H | H | –C₆H₄–NHCH₃ | 2–CH₃ | H | H | 0 |
| Cl | H | H | –C₆H₄–N(CH₃)₂ | 2–CH₃ | H | H | 0 |
| Cl | H | H | –C₆H₄–CF₃ | 2–CH₃ | H | H | 0 |
| Cl | H | H | –C₆H₄–SO₂NH₂ | 2–CH₃ | H | H | 0 |
| Cl | H | H | –C₆H₃(CH₃)₂ (2,6-dimethyl) | 2–CH₃ | H | H | 0 |
| Cl | H | H | –C₆H₄–CH₃ | –CH₃ | H | H | 0 |

The new compounds may be prepared by reducing the corresponding 1,2-unsaturated compounds with a borohydride, for example sodium borohydride in the presence of aluminum chloride:

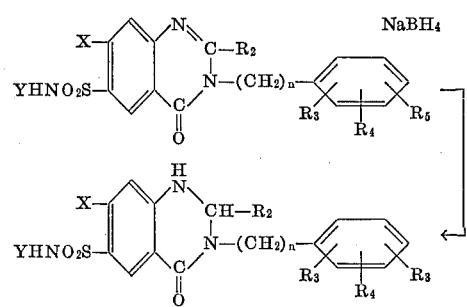

Alternatively, the corresponding 1,2-unsaturated compounds may be reduced with hydrogen in the presence of a hydrogenation catalyst, for example a ruthenium or platinum catalyst.

The compounds as so obtained will have hydrogen on the nitrogen at the 1-position, i.e., $R_1$=H. This hydrogen may be replaced by an alkyl group by means of an alkylating agent, for example an alkyl halide and, if necessary, an appropriate catalyst. The hydrogen in the 1-position may, in similar manner, be replaced by an aralkyl group.

The new compounds may also be produced from the anthranilamide as indicated by the following reaction scheme:

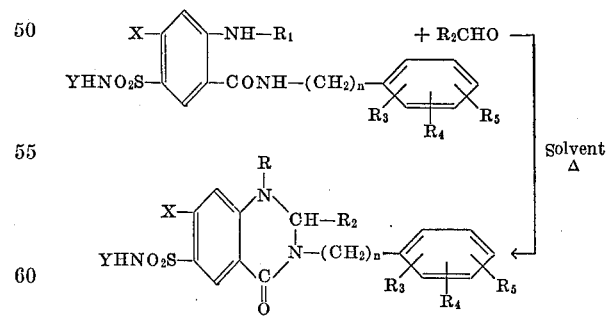

The aldehyde reactant $R_2CHO$ may be replaced by a ketone $R_2COR'_2$ or by acetals $R_2CH(OR)_2$ or

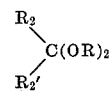

for example $CH_3CH(OCH_3)_2$. The reaction is suitably carried out in a solvent at elevated temperature under acid conditions, an excess of the aldehyde, ketone or acetal being preferably used.

The invention is illustrated in the following example.

EXAMPLE 1

Preparation of 2-phenyl-3-(o-tolyl)-6-sulfamyl-7-chloro-1,2,3,4-tetrahydro-4-quinazolinone

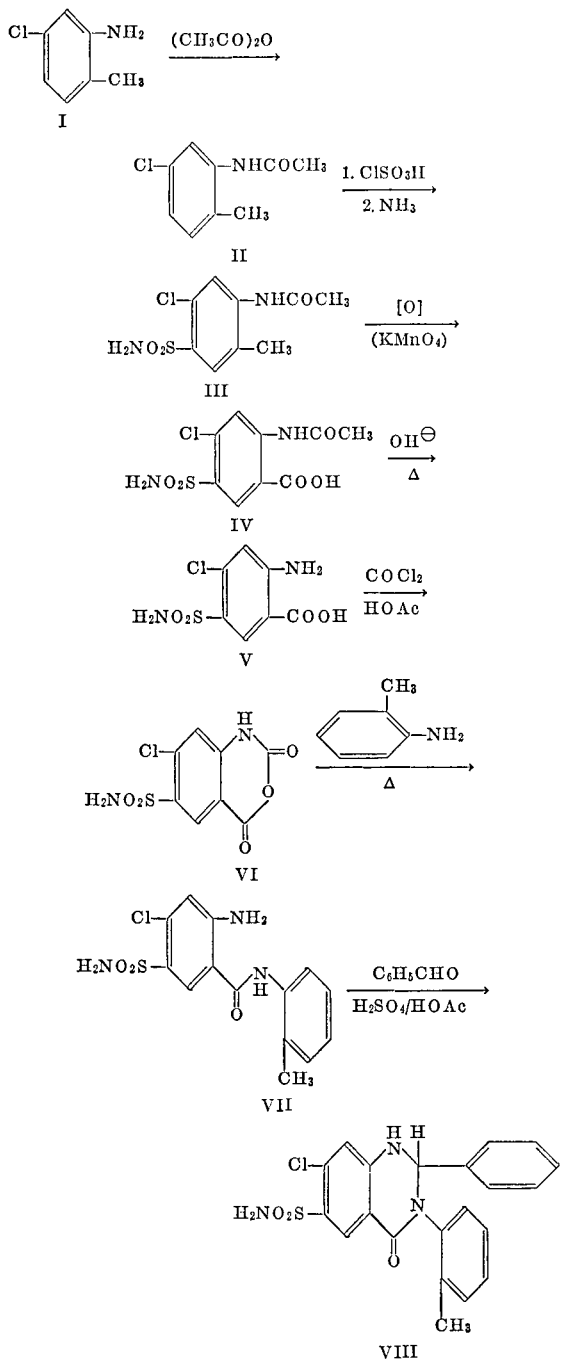

Preparation of 2-phenyl-3-(o-tolyl)-6-sulfamyl-7-chloro-1,2,3,4-tetrahydro-4-quinazolinone, VIII 2 - amino - 4-chloro-5-sulfamyl-N-(o-tolyl)-benzamide (10 gm.), benzaldehyde (6 gm.), acetic acid (120 ml.), and 5 drops of sulfuric acid were stirred 2 hours at room temperature and filtered. The filtrate was concentrated to dryness and the residue recrystallized from 600 ml. ethyl acetate-hexane (4:1) to give 5.9 gm. 2-phenyl-3-(o-tolyl)-6 - sulfamyl - 7-chloro-1,2,3,4-tetrahydro-4-quinazolinone, M.P. 241–3°.

Cl, 8.29. Found (percent): C, 58.80; H, 4.24; N, 9.89; S, 7.52; Cl, 8.40.

The other compounds of this invention may be made by modification of ingredients and quantities of the above examples as is well understood by those skilled in the art.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

From pharmacological tests run on 2-phenyl-3-o-tolyl-6 - sulfamyl - 7 - chloro - 1,2,3,4 - tetrahydro - 4 - quinazolinone (compound SR 747–582) and other indications and analogy it appears that all of the compounds of this invention are effective diuretics and saluretics with low toxicity.

For example, compound 2-phenyl-3-o-tolyl-6-sulfamyl-7-chloro-1,2,3,4-tetrahydro-4-quinazolinone (SR 747–582) was compared to hydrochlorothiazide as a reference standard with respect to diuretic activity. Sodium, potassium and chloride excretion was measured. The method of assay for diuretic activity was that of Lipschitz, Hadidian and Kerpcsar (J. Pharmaco. Exp. Therap. 77: 97, 1943). Male Sprague-Dawley rats weighing 150–200 g. were used and were prehydrated according to the procedure described by Aston (Toxicol. Applied Pharmacol. 1: 277, 1959). No less than four and often eight rats were used at each dose level; they were kept four to a cage. The compounds were administered orally by stomach tube, together with an isotonic saline load of 2.5 ml. per 100 g. body weight. Urine was collected under light mineral oil in borosilicate Erlenmeyer flasks during the four-hour period immediately after treatment and the volume was recorded. Aliquots of collected urine were analyzed for sodium, potassium and chloride. Results were plotted as dose-response curves, and the relative activities of the compounds were calculated from these curves. Compound SR 747–582 produced a dose-response curve with a more gradual slope than that of hydrochlorothiazide. Compound SR 747–582, however, was greatly superior to 2-benzyl - 3 - o - tolyl - 6 - sulfamyl - 7 - chloro - 1,2,3,4-tetrahydro-4-quinazolinone (compound SR 751-342).

| Compound | Relative activity with respect to excretion of, | | | |
|---|---|---|---|---|
|  | Volume | Sodium | Potassium | Chloride |
| Hydrochlorothiazide | 1.0 | 1.0 | 1.0 | 1.0 |
| SR 747-582 | 0.2-1.0 | 1.0 | 1.0 | 1.0 |
| SR 751-342 | 0.001 | 0.001 | <0.001 | 0.001 |

The above compound SR 747–582 and the other compounds of this invention are suitable for inducing diuresis in warm blooded animals when administered in .1 mg.– 10 mg. per kg. of body weight. The compounds may be administered in the same manner as for hydrochlorothiazide, orally or intravenously.

What I claim is:
1. A compound of the formula:

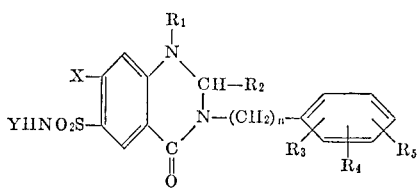

or any of the pharmaceutically effective salts thereof, in which

X is halogen or trifluoromethyl,
Y is hydrogen or lower alkyl,
$R_1$ is hydrogen or lower alkyl, or phenyl lower alkyl, $R_2$ is phenyl or phenyl substituted with lower alkyl, halogen, lower alkoxy, lower alkoxy lower alkyl, amino, lower alkyl substituted amino, trifluoromethyl, sulfamyl or hydroxy, $R_3$ is hydrogen, lower alkyl, hydroxy, lower alkoxy, lower alkoxy lower alkyl, amino, lower alkyl substituted amino, sulfamyl, halogen or trifluoromethyl, $R_4$ and $R_5$ are any of $R_3$, and $n$ is an integer from 0–4.

2. A compound according to claim 1 wherein $R_1$ is hydrogen or lower alkyl.

3. A compound according to claim 2, in which $n$ is 0.

4. A compound according to claim 3, in which Y is hydrogen.

5. A compound according to claim 2, in which $R_4$ and $R_5$ are both hydrogen.

6. A compound according to claim 1, in which $R_2$ is phenyl.

7. A compound according to claim 2, in which $R_2$ is phenyl.

8. The compound according to claim 3, which is 2-phenyl - 3 - o - tolyl - 6 - sulfamyl - 7 - chloro - 1,2,3,4-tetrahydro-4-quinazolinone.

9. The compound according to claim 3, which is 2-phenyl - 3 - o - tolyl - 6 - sulfamyl - 7 - trifluoromethyl-1,2,3,4-tetrahydro-4-quinazolinone.

10. The compound according to claim 3, which is 2-tolyl - 3 - o - tolyl - 6 - sulfamyl - 7 - chloro - 1,2,3,4-tetrahydro-4-quinazolinone.

11. The compound according to claim 3, which is 1-methyl - 2 - phenyl - 3 - o - tolyl - 6 - sulfamyl - 7-chloro-1,2,3,4-tetrahydro-4-quinazolinone.

12. The compound according to claim 3, which is 2-(2' - chloro - phenyl) - 3 - o - tolyl - 6 - sulfamyl - 7 - chloro-1,2,3,4-tetrahydro-4-quinazolinone.

13. The compound according to claim 3, which is 2-phenyl - 3 - phenyl - 6 - sulfamyl - 7 - chloro - 1,2,3,4-tetrahydro-4-quinazolinone.

References Cited

UNITED STATES PATENTS 3,360,518   12/1967   Shetty _____ 260–256.5

ALEX MAZEL, Primary Examiner

R. J. GALLAGHER, Assistant Examiner

U.S. Cl. X.R.

260—244, 397.7; 424—200, 251